March 17, 1959  G. H. DOWTY  2,877,969
AIRCRAFT BRAKING MECHANISM
Filed Jan. 26, 1954  5 Sheets-Sheet 1
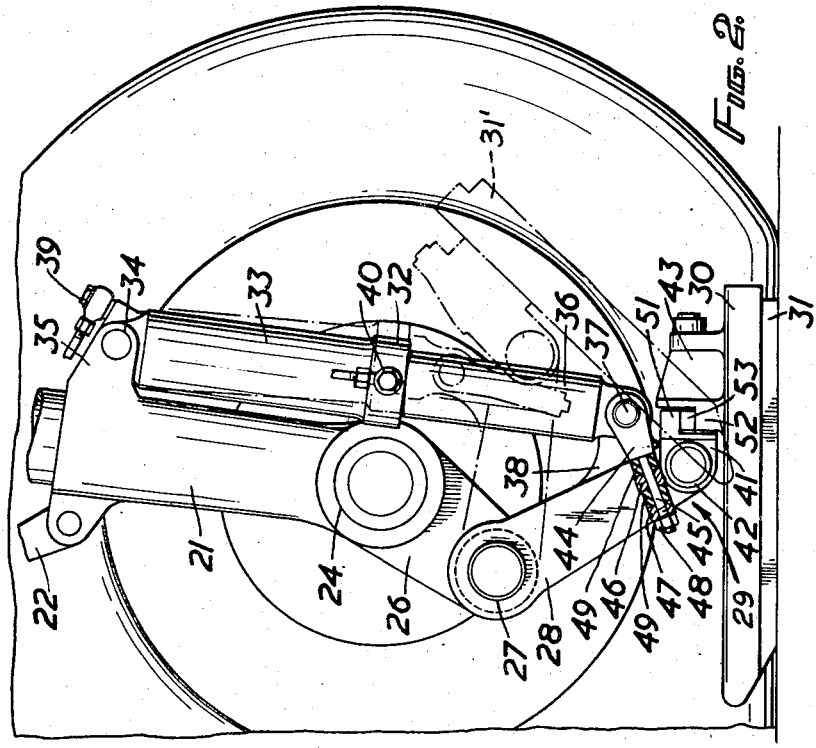
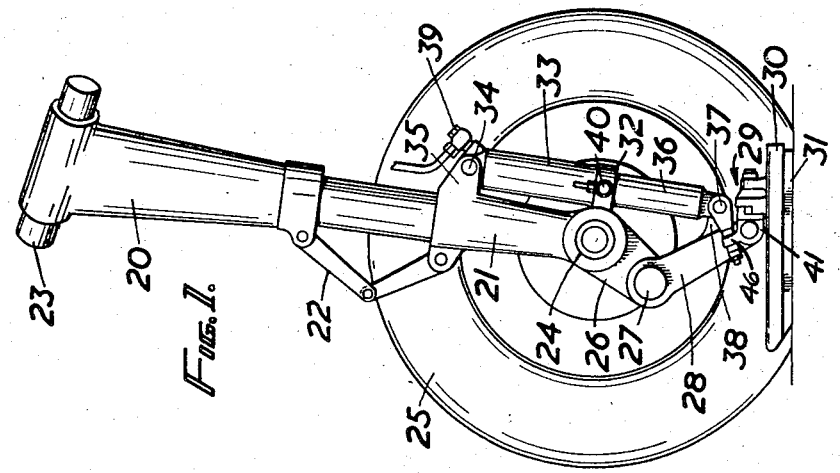
INVENTOR
George Herbert Dowty
BY Reynolds, Beach & Christensen
ATTORNEYS March 17, 1959 G. H. DOWTY 2,877,969
AIRCRAFT BRAKING MECHANISM
Filed Jan. 26, 1954 5 Sheets-Sheet 2

INVENTOR
George Herbert Dowty
BY Reynolds, Beck & Christon
ATTORNEYS

March 17, 1959  G. H. DOWTY  2,877,969
AIRCRAFT BRAKING MECHANISM
Filed Jan. 26, 1954  5 Sheets-Sheet 3

INVENTOR
George Herbert Dowty
BY Reynolds, Beach & Christensen
ATTORNEYS

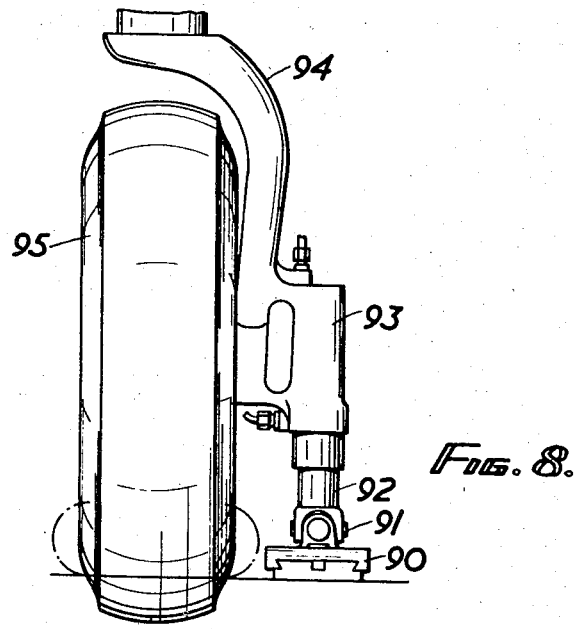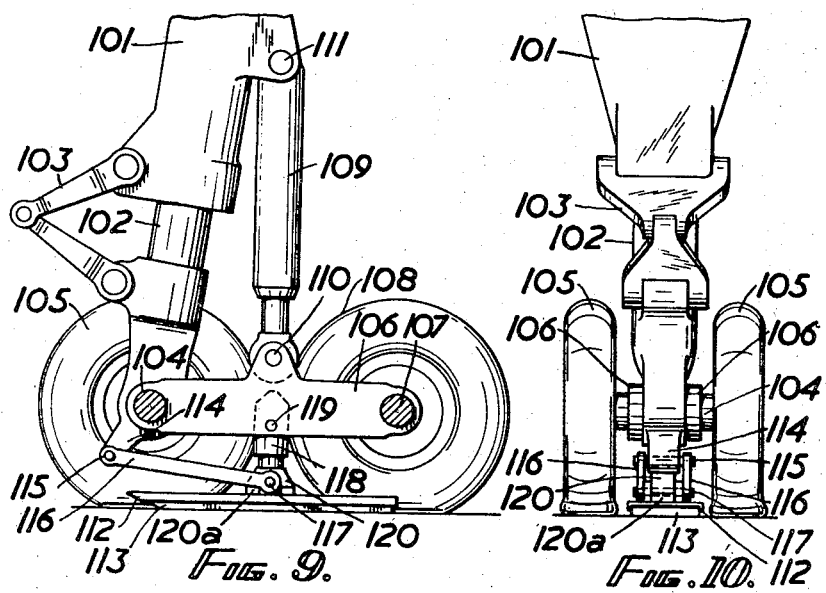

March 17, 1959 G. H. DOWTY 2,877,969
AIRCRAFT BRAKING MECHANISM
Filed Jan. 26, 1954 5 Sheets-Sheet 5

INVENTOR
George Herbert Dowty
BY Reynolds, Beach & Christensen
ATTORNEYS

United States Patent Office
2,877,969
Patented Mar. 17, 1959

2,877,969

AIRCRAFT BRAKING MECHANISM

George D. Dowty, Cheltenham, England

Application January 26, 1954, Serial No. 406,149

Claims priority, application Great Britain
January 30, 1953

5 Claims. (Cl. 244—110)

In aircraft which are retarded during landing by braked wheels, the brakes generate a large amount of heat in a short time during which only a part of this heat is dissipated by radiation and conduction to the surrounding air, while the rest has to be absorbed by the brake friction elements which must have sufficient thermal capacity to prevent overheating and consequent damage. Brakes for aircraft wheels therefore generally have heavy reaction plates, constructed in the main from copper or steel, which form a considerable proportion of the weight of the aircraft undercarriage.

These brake plates can be regarded as a dead weight load on the aircraft insofar as they are inactive during flight and only function after the aircraft has touched down on landing. This dead weight load becomes a serious disadvantage in reducing potential pay load particularly on jet propulsion aircraft since these generally have high landing speeds and low drag, and cannot by their nature be provided instead with the reverse pitch braking of propeller driven aircraft.

The main object of the present invention is to provide aircraft brake mechanism including friction pads which, instead of co-operating with the brake reaction plates heretofore carried by an aircraft, are adapted for direct engagement with a prepared landing surface such as a concrete runway.

More specifically, an object of this invention is to provide aircraft brake mechanism in combination with a wheeled undercarriage, which brake mechanism includes a friction pad mounted for yieldable engagement at controllable pressure with a prepared landing surface such as a concrete runway.

Another object is to provide brake mechanism wherein the friction pad is mounted so that it will maintain contact over its entire area with the landing surface irrespective of changes in attitude of the aircraft.

A further object of the invention is to provide friction pads for use in the aforesaid brake mechanism, which consist of material suitable for direct engagement with a concrete runway.

The invention is applicable to various forms of undercarriage illustrated, by way of example, in the accompanying drawings, of which:

Figure 1 is a side elevation of a telescopic shock-absorbing main leg with the novel brake mechanism mounted on the lower component of the leg;

Figure 2 shows the lower part of the leg and the brake mechanism of Figure 1 on an enlarged scale;

Figure 7:
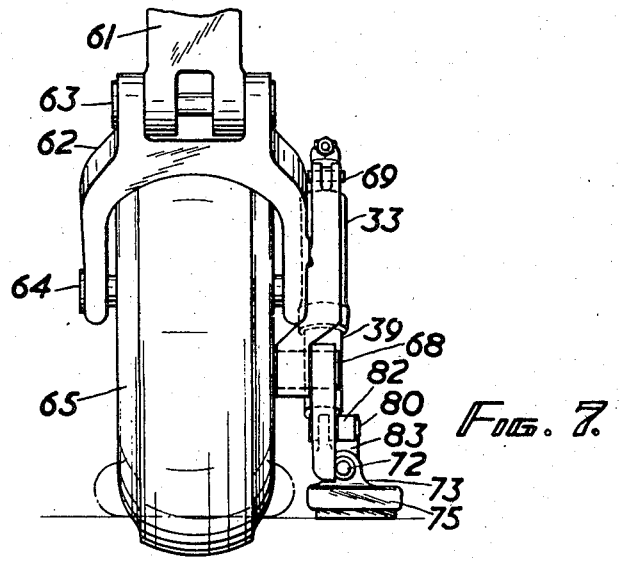

Figure 7 a front elevation of a levered suspension main undercarriage incorporating similar brake mechanism;

Figure 8 is a front elevation of a modified brake pad mounting applied to a single-wheel-carrying leg;

Figure 9 is a side elevation of a multi-wheel bogie undercarriage with the near side set of wheels removed to show the brake mechanism;

Figure 10 is a front elevation of the undercarriage of Figure 9; and

Figure 11:
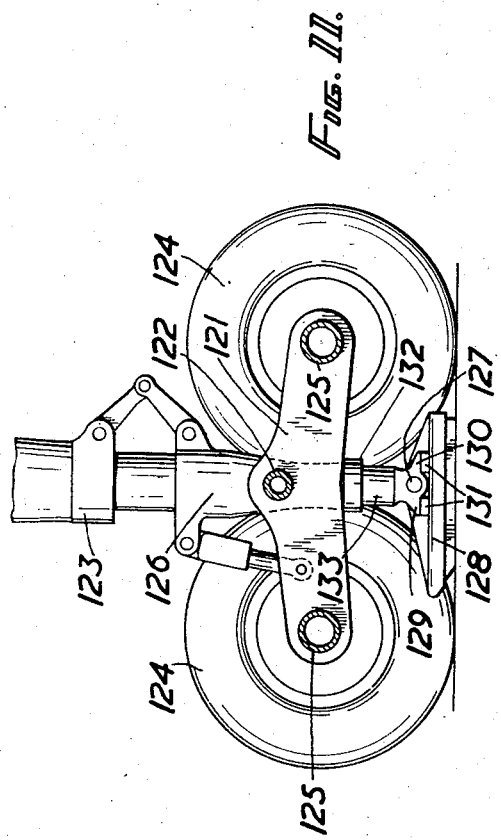

Figure 11 is a side elevation of another form of bogie undercarriage with the near side set of wheels removed to show the brake assembly.

Figures 3, 4:
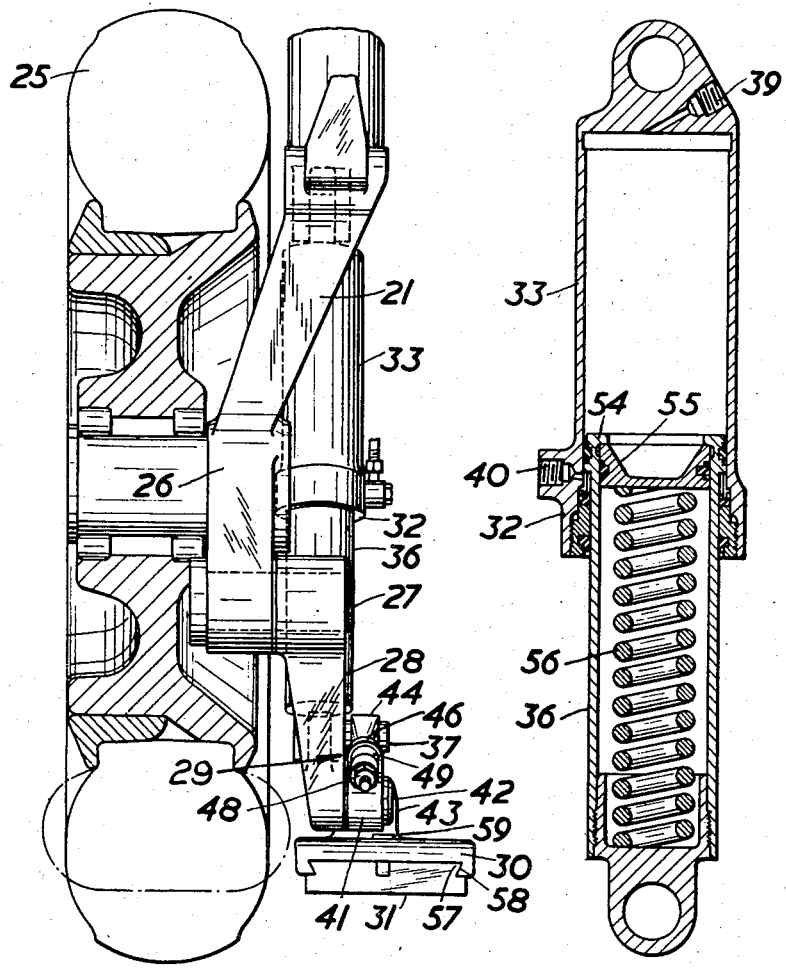
Figure 3 is a front elevation, partly in section, of the leg and brake assembly of Figure 2.
Figure 4 is a central sectional view of the fluid pressure jack which actuates the brake mechanism.

Referring to the embodiment shown in Figures 1, 2 and 3, the telescopic shock absorbing leg comprises the known construction of an upper component 20 and a lower component 21 connected by torque links 22. The upper component 20 is formed with a retraction pivot 23 at its upper end, while the lower component 21 carries a stub axle 24 on which a wheel 25 is mounted. An arm 26, integral with the lower leg component 21 carries at its outer end a transverse pivot 27 upon which one end of a lever 28 is mounted. This lever constitutes a mounting upon the lower end whereof a brake shoe is carried for rocking both fore and aft and laterally of the fore and aft direction, as by a universal joint or coupling, indicated generally at 29 in Figure 1, which is fixed to a shoe 30 in which a friction pad 31 is secured. A telescopic jack 32 adapted for fluid-pressure actuation comprises a cylinder 33 attached by a pivot pin 34 to a lug 35 on the lower leg component 21, and a plunger 36 attached by a pivot pin 37 to a lug 38 on the lever 28. The jack 32 is double acting and has an inlet connection 39 to which fluid pressure may be admitted for extending the plunger 36, and an inlet connection 40 to which fluid pressure may be admitted for retracting the plunger 36.

The coupling 29, see Figure 3, consists of a headed pin 41 jointed to the lever 28 on a transverse hinge pin 42, the shank of the headed pin 41 extending rearwardly through a socket piece 43 which is fixed to or integral with the shoe 30. An eye-bolt 44 is mounted on the pivot pin 37 at the lower end of the plunger 36, and the shank 45 of the eye-bolt 44 extends through an apertured lug 46 on the headed pin 41 to a screw threaded termination which is fitted with a washer 47 and a nut 48. Elastic rubber blocks 49 are fitted on the shank 45 on opposite sides of the lug 46. The resilient connection thereby established between the eye-bolt 44 and the lug 46 on the headed pin 41 is designed to bring the friction pad 31 approximately into a horizontal fore and aft position adjacent the ground when the jack 32 is extended, while the elastic rubber blocks 49 enable the shoe 30 to rock fore and aft on the hinge pin 42 sufficiently for the friction pad 31 to maintain fore and aft contact with the ground, irrespective of ground surface irregularities or changes in attitude of the aircraft. The headed pin 41 has a shoulder 51, and the socket 43 a shoulder 52, both shoulders being separated one from the other and having elastic rubber blocks 53 interposed between them. The shoulders 51 and 52 and the rubber blocks 53 between them ensure that the shoe 30 lies in an approximately transverse parallelism with the ground when the jack 32 is extended, while the elastic rubber blocks 53 allow the friction pad to rock transversely for maintaining transverse contact with ground irrespective of surface irregularities or changes in lateral trim of the aircraft. The center of pressure of the friction pad 31 is preferably arranged forwardly of the axis of the hinge pin 42, so that the resultant of normal pressure and frictional drag passing through the center of pressure intersects the axis of the hinge pin.

When landing an aircraft fitted with the braking mechanism described, the friction pad is held retracted clear of the ground as at 31' in Figure 2 for touch down, and it is not lowered on to the ground until the aircraft is fully ground-borne. The degree of braking may then be regulated by controlling the pressure of fluid applied to the jack 32 at the connection 39. It is desirable that the friction pad 31 should be pressed against the ground resiliently to allow for ground irregularities and for flattening of the tire under load, and with this object in view the jack 32 may be actuated by compressed air so that the necessary resilience is provided by the natural elasticity of the pressure medium. If on the other hand a liquid pressure medium is to be used, it is necessary to provide auxiliary resilient means such as is embodied in the double-acting jack illustrated in Figure 4. Liquid admitted at 39 acts over the full diameter of the plunger head 54 to extend the jack and apply the braking load, thus relieving the wheel 25 of part of the aircraft load. Retraction of the jack 32 is required only to lift the movable part of the brake mechanism and thus the narrow annular area of the head 54 between the bore of the cylinder 33 and the outside diameter of the plunger 36, under pressure at the connection 40, is sufficient for this purpose. The head 54 is internally flanged to provide an outstop for a piston 55 mounted slidably within the plunger 36, while a pre-loaded spring 56 is interposed between the base of the plunger 36 and the piston 55 to press the latter against the head. The spring 56 is loaded to yield under a predetermined liquid pressure acting on the piston 55 and it is not fully compressed under the maximum brake actuating pressure in the jack 32, whereby the piston 55 will be resiliently displaceable within the plunger 36 under shock loads acting on the friction pad 31.

The friction pad 31 will generally wear down fairly rapidly owing to the abrasive quality of the ground surface, and for this reason it should be readily replaceable in the shoe 30. The fixing, as shown in Figure 3, may for simplicity comprise a dove-tail backing 57 on the friction pad 31 which is slidable into a dove-tail slot 58 in the shoe 30, in the manner of a bicycle brake block, and is held against chance forward sliding by a pin 59 which is inserted through the shoe 30.

Figure 5:
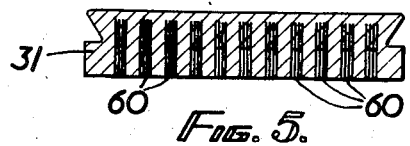
Figure 5 is a transverse sectional view of a modified form of friction pad.

The material of the friction pad is chosen for its frictional and wear resisting properties. For a concrete runway it is found that a friction pad of hard synthetic rubber, for example of about 70 Shore hardness, has good frictional properties and a wear resistance which should enable the pad to be used for at least one landing before replacement. The rubber may be reinforced with a matrix of material which is harder than the rubber. One form of reinforced pad is illustrated in Figure 5 wherein a plurality of wire brush tufts 60 are embedded into the synthetic rubber pad 31 during the moulding process. An alternative form of friction pad may comprise a wire brush alone, wherein a plurality of wire tufts are fixed in a rigid backing of dove-tail form which is slidable into the shoe 30.

Figure 6:
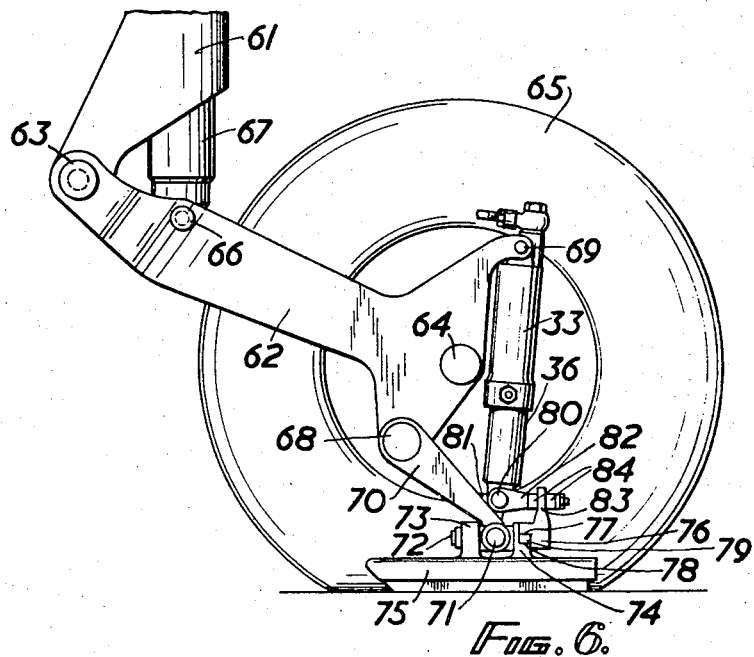
Figure 6 is a side elevation.

In Figures 6 and 7, the lower portion of an undercarriage leg 61 is shown having a suspension lever 62 attached to a pivot 63 at the lower end of the leg 61. The outer end of the lever 62 is forked to support the ends of an axle 64 which carries a wheel 65, while a pivot pin 66 passes through an intermediate point on the lever 62 and the lower end of a shock absorber 67 mounted within the leg 61. The outer end of the lever 62 is enlarged by a downwardly extending arm carrying a pivot pin 68 and by an upwardly extending arm carrying a pivot pin 69. A lever 70 is mounted at one end on the pivot pin 68 and its other end carries a hinge pin 71 which extends transversely through a trunnion 72. The trunnion extends longitudinally through bearing sockets 73 and 74 which are fixed to a brake shoe 75. One end of the trunnion 72 has a head 76 formed with a shoulder 77 which together with a shoulder 78 on the bearing socket 74 contain between them rubber blocks 79.

A double-acting jack such as described with reference to Figure 4 has its cylinder 33 attached to the pivot pin 69 and its plunger 36 attached to a pivot pin 80 which is fixed in a lug 81 formed on the lever 70. An eye-bolt 82 mounted on the pivot pin 80 extends through an apertured arm 83 which is integral with the head 76, and it carries rubber blocks 84 on opposite sides of the arm 83. The suspension of the shoe 75 is thus equivalent to the suspension of the shoe 30 in Figures 1, 2 and 3, and it operates to apply the brake and maintain the friction pad 31 in conformity with the ground in a similar manner.

Whereas the foregoing embodiments show a lever mounting for the brake shoe, Figure 8 shows a telescopic mounting wherein a brake shoe 90 is mounted by means of a universal coupling 91 of the Hooke's Joint type at the lower end of a jack plunger 92. The cylinder of the jack is formed in a boss 93 which is formed integral with the leg 94 on which the wheel 95 is mounted.

Figures 9 and 10 illustrate the application of the invention to one form of multi-wheel bogie undercarriage. In this, a freely telescopic leg comprises an upper component 101 adapted to be secured to an aircraft, and a lower component 102 which is slidably mounted in the upper component 101 and connected with it by torque linkage 103. The lower component 102 mounts an axle 104 for a front set of wheels 105 and this axle also forms a pivot on which a lever 106 is mounted. The rear end of the lever 106 mounts an axle 107 for a rear set of wheels 108, while a telescopic shock absorber 109 capable of supporting the entire ground load is interposed between a medial pivot 110 on the lever 106 and a pivot 111 on the upper component 101.

The brake mechanism comprises a shoe 112 having a friction pad 113 mounted therein constructed such that the friction pad 113 and shoe 112 are disposed between the near side and off-side wheels and within the longitudinal compass of the front and rear sets of wheels 105 and 108. The lower component 102 has a downwardly extending arm 114 integral therewith and provided with a pivot 115 for the forward end of a drag link 116. The rearward end of the drag link 116 is pivotally jointed at 117 to the shoe, and a brake-actuating fluid-pressure jack 118 is interposed between the pivot 117 and a pivot 119 on the lever 106. The pivot 119 is disposed at the calculated instantaneous center of rotation of the lever 106 so that the reaction load of the jack 118 cannot induce any pitching moment on the lever 106, while the drag load on the link 116 is applied to the lower component 102 in a direction substantially normal to its axis so that this drag load also cannot induce any pitching moment on the lever 106. The jack 118 is formed with a plunger head 120 which is shaped to co-operate with buffer means 120a in presenting the friction pad 113 substantially horizontally to the ground, yet permitting angular movement of the friction pad 113 and shoe 112 against the restraint of the buffer means 120a.

Figure 11 shows a further form of bogie undercarriage wherein a rigid bogie frame 121 extends fore and aft of a pivot 122 at the lower end of a telescopic shock-absorbing leg 123. Four wheels 124 are mounted in pairs on stub axles 125 at the front and rear of the bogie frame 121. The lower telescopic component 126 of the leg has a downward extension below the pivot 122 forming a jack cylinder 132 in which a jack plunger 133 is slidably mounted. The lower end of the plunger 133 carries a hinge pin 127 on which a brake shoe 128 is mounted. The plunger 133 is formed with steps 129, 130 extending to the front and rear respectively of the pivotal connection 126, while elastic rubber blocks 131 are interposed between the steps 129, 130 and the flat upper face of the shoe 128. The steps 129, 130 thus control the attitude of the brake shoe 128 in relation to the ground, while the blocks 131 allow for accommodating movement of the latter about the transverse hinge pin 127. Raising and lowering of the brake shoe 128 and the application of pressure to the shoe 128 is thus accomplished by the jack 132.

It is found that braking mechanism in the various forms described can, for the same duty as wheel brakes, be constructed with a substantial saving in weight having regard to the weight of brake plates or discs conventionally employed, and that the consequent increase in pay-load offers an economy in operaiton of the aircraft after allowance is made for the replacement of friction pads. Since the undercarriage wheels are without brakes or at the most provided only with light parking brakes, tire wear will be reduced and an economy in the high cost of these will be realized.

I claim:

1. In combination, aircraft landing gear comprising a retractable shock-absorbing leg assembly having an upper component adapted for pivotal connection with the aircraft and a wheel-carrying lower component movable upwardly and downwardly with respect to the upper component when the leg assembly is in its upright operative position, and brake mechanism comprising an extensible and contractable fluid pressure jack pivotally connected at its one end entirely to said lower leg component so as to partake both of shock-absorbing movement of said lower leg component and retraction movement with said leg, and a link pivoted at one end to the lower component and at its opposite end to the other end of said fluid pressure jack, said jack and link, with the intervening portion of the lower component, constituting a jointed structure, a brake shoe articulated with respect to said jointed structure adjacent the lower end of said jack, and a ground-engaging friction element mounted in the brake shoe, said friction element being positioned, when the leg assembly and the jack are both extended, for superficial frictional engagement with the ground, to dissipate kinetic energy of the aircraft on landing.

2. In the combination according to claim 1, the fluid pressure jack comprising a cylinder having liquid connections at opposite ends thereof, a hollow plunger mounted slidably in the cylinder, a head on the plunger slidably fitting the bore of the cylinder, the diameter of the head being slightly greater than that of the plunger so as to provide a narrow annular area of the head on the plunger side thereof subject to liquid pressure in the connection at the inner end of the cylinder for contraction of the jack, and the full area of the head subject to liquid pressure in the connection at the outer end of the cylinder for extension of the jack, a piston mounted within the bore of the hollow plunger, an internal flange on the plunger head forming an outstop for the piston, and spring means disposed in the hollow plunger to urge the piston compressively against said outstop, said spring means being pre-loaded so as to be yieldable under a predetermined liquid pressure acting on the full area of the piston from the cylinder to cushion the extension action of the jack under liquid pressure.

3. In combination, aircraft landing gear comprising a retractable shock-absorbing leg assembly having an upper component adapted for pivotal connection with the aircraft and a wheel-carrying lower component movable with respect to the upper component, and brake mechanism comprising a link which in its operative position is generally upright, pivotally connected at its upper end to said lower leg component whereby its other, lower, end may swing towards and away from the ground, a generally upright fluid pressure jack pivotally connected at its upper end to the lower leg component and at its lower end to the link, and operable to swing said link downwardly into its operative position, or upwardly into an inoperative position, said link and jack, and the intervening portion of the lower component constituting a jointed structure, a brake shoe hingedly connected to said jointed structure so as to be movable independently of the wheel towards and way from the ground by said jack though partaking both of shock-absorbing movement of said lower leg component and retraction movement with said leg, and a frictional element mounted in the brake shoe, said friction element being positioned for superficial frictional engagement with the ground, when said leg assembly is extended and said jointed structure is extended by the fluid pressure jack, for dissipating kinetic energy of the aircraft on landing.

4. In combination, aircraft landing gear comprising an upper aircraft-supporting component and a lower wheel-carrying component movably interconnected, shock-absorbing means engaged between said components and resiliently transmitting the weight of the aircraft from said upper component to said lower component as said components move relatively during landing and taxiing, and a wheel mounted on said lower wheel-carrying component in ground-engageable position; and brake mechanism comprising a ground-engageable shoe, and shoe-carrying means supporting said shoe in ground-engageable position solely from said lower wheel-carrying component and disposed alongside said wheel in ground-engageable position, said shoe-carrying means including universal joint means mounting said shoe for rocking both fore and aft and laterally relative to said lower wheel-carrying component to maintain effective contact of said shoe with the ground despite ground irregularities, and said shoe-carrying means further including fluid-pressure jack means reacting from said lower wheel-carrying component and operable to press said shoe forcibly downwardly into engagement with the ground.

5. The combination of claim 4, including resilient positioning means interposed between the shoe and the shoe-carrying means and maintaining the universally rockable shoe in a predetermined attitude relative to the shoe-carrying means when the shoe is clear of the ground.

References Cited in the file of this patent

UNITED STATES PATENTS

| | | |
|---|---|---|
| 1,812,806 | Sexton | June 30, 1931 |
| 1,891,188 | Stalb | Dec. 13, 1932 |
| 2,106,934 | Saulnier | Feb. 1, 1938 |
| 2,390,127 | Schneckloth | Dec. 4, 1945 |
| 2,437,108 | Madison | Mar. 2, 1948 |
| 2,661,203 | Gordon et al. | Dec. 1, 1953 |
| 2,687,191 | Shannon | Aug. 24, 1954 |
| 2,793,827 | Ries et al. | May 28, 1957 |

FOREIGN PATENTS

| | | |
|---|---|---|
| 670,589 | France | Aug. 19, 1929 |
| 979,113 | France | Dec. 6, 1950 |

UNITED STATES PATENT OFFICE

CERTIFICATE OF CORRECTION

Patent No. 2,877,969                                                March 17, 1959

George H. Dowty

It is hereby certified that error appears in the above numbered patent requiring correction and that the said Letters Patent should read as corrected below.

In the grant, lines 1 and 12, and in the heading to the printed specification, line 3, name of inventor, for "George D. Dowty", each occurrence, read -- George H. Dowty --; column 6, line 10, for "way" read -- away --.

Signed and sealed this 8th day of September 1959.

(SEAL)
Attest:

KARL H. AXLINE                                                 ROBERT C. WATSON
Attesting Officer                                            Commissioner of Patents